March 28, 1967     B. J. FRYE     3,311,339
SELF-HOLDING DEVICE
Filed Feb. 7, 1966     2 Sheets-Sheet 1
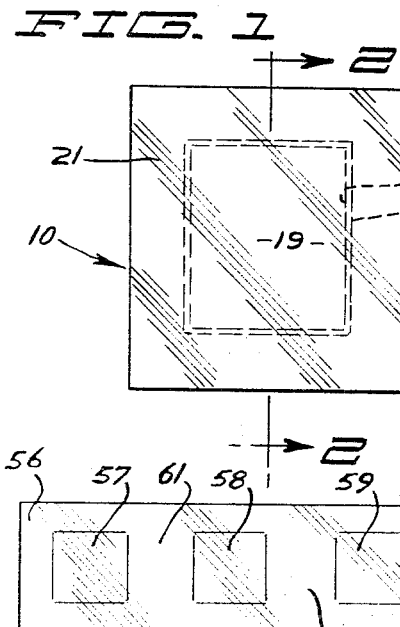
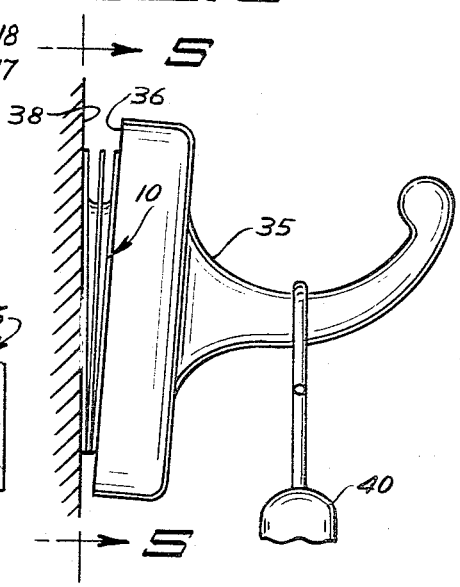
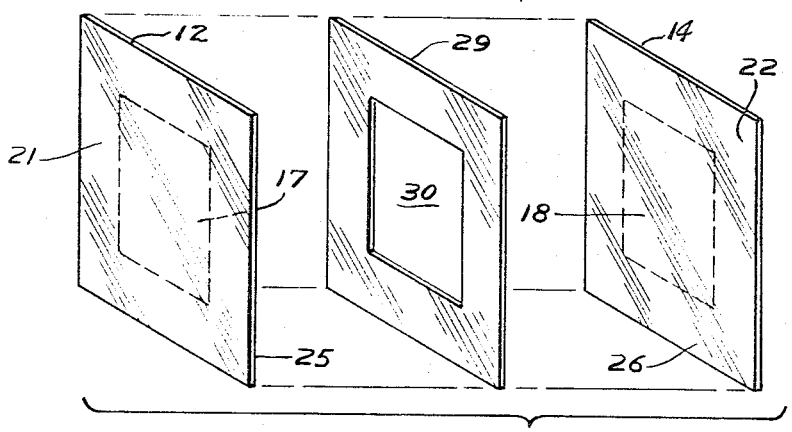
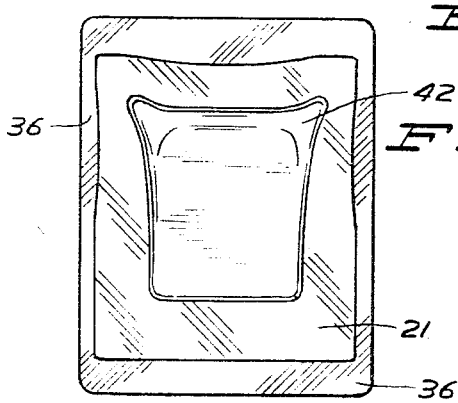
INVENTOR.
BRUCE J. FRYE
BY
ATTORNEYS March 28, 1967 B. J. FRYE 3,311,339
SELF-HOLDING DEVICE
Filed Feb. 7, 1966 2 Sheets-Sheet 2

INVENTOR.
BRUCE J. FRYE
BY
Richard Gregory
ATTORNEYS

3,311,339
SELF-HOLDING DEVICE
Bruce J. Frye, 1806 Longview Drive,
New Brighton, Minn. 55112
Filed Feb. 7, 1966, Ser. No. 533,758
14 Claims. (Cl. 248—205)

This application is a continuation in part of my co-pending applications S.N. 378,294, filed June 26, 1964, on "Flexible Self-Holding Device," and S.N. 417,389, filed Dec. 10, 1964, on "Self-Holding Device."

The invention herein relates to improvements in the construction of a flexible holding device having oppositely outwardly facing adhesive surfaces for removably supporting an article on a supporting surface.

It is an object of the invention herein to provide a flexible holding member having substantial load bearing capacity, said member being arranged to have opposed outwardly facing adhesive surfaces having effective holding capacity.

It is also an object of this invention to provide a holding member formed of flexible plastic sheet material.

It is a more specific object of this invention to provide a flexible holding member having a unitary central portion and having a separated marginal portion thereabout, said marginal portion having non-adhesive facing surfaces.

These and other objects and advantages of the invention will be fully set forth in the following description made in connection with the accompanying drawings in which like reference characters refer to similar parts throughout the several views and in which:

FIG. 1 is a plan view of the device herein with a portion thereof shown in dotted line;

FIG. 2 is a view on an enlarged scale in vertical section taken on line 2—2 of FIG. 1 as indicated;

FIG. 3 is a view of the device herein in side elevation shown in an operating position supporting a hanger with a workpiece in broken view supported thereby;

FIG. 4 is an exploded view of the device showing portions thereof in separated position;

FIG. 5 is a view as rear elevation taken on line 5—5 of FIG. 3 as indicated;

FIGS. 6 and 7 are fragmentary views similar to FIG. 2 respectively showing modifications of the device herein;

FIG. 8 shows another modification of the device herein in plan view;

Figure 9:
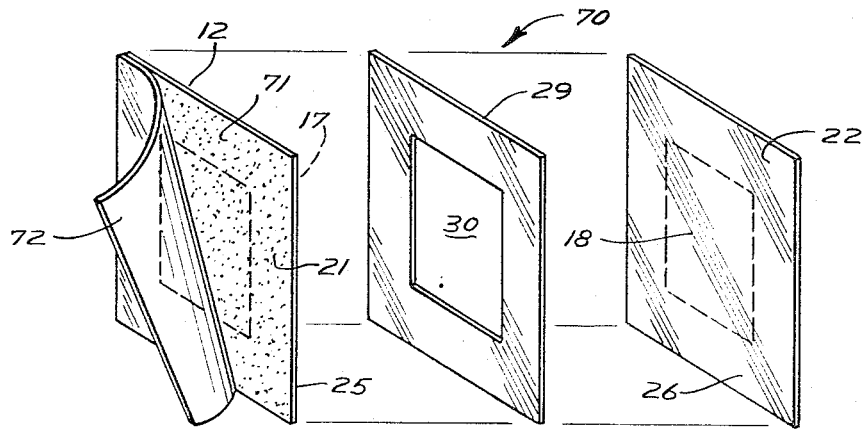
FIG. 9 is a view similar to FIG. 4 showing a modification thereof.

Referring to the drawings, a preferred embodiment of the invention herein is disclosed in the form of the device indicated generally by the reference numeral 10. Said device comprises a pair of superposed layers 12 and 14 of a flexible sheet material having a naturally self adhesive characteristic, such as plasticized polyvinyl chloride, which has been found to be unusually satisfactory. The presence of this naturally self adhesive or holding characteristic is dependent upon this material having a very smooth surface. Naturally self adhesive materials are, of course, known in the art. Hence, the outwardly facing sides 15 and 16 of said layers 12 and 14 comprise such smooth surfaces having very good adherence to smooth relatively non-porous surfaces such as ceramic, rigid plastic tile, glass, porcelain, painted enamel surfaces and the like.

Thus the surfaces of said device form non-tacky non-sticky removably self adhesive or holding surfaces and this adhesive characteristic is retained by said surfaces 15 and 16 relatively indefinitely.

The invention herein has to do with the unique structural arrangement and construction of the device to provide substantial load bearing capacity while allowing for easy removal.

The central portions of the facing sides of said layers 12 and 14 are indicated by the reference numerals 17 and 18. In a manner well known in the art said central portions of said facing sides 17 and 18 are bonded or fused together so as to form the integral portion indicated by the reference numeral 19.

The marginal portions 21 and 22 of said layers 12 and 14 are arranged to have their facing surface portions 25 and 26 non-adhesive or free from adherence with one another as hereinafter explained. Thus said device 10 has separated marginal portions having non-adhesive facing surfaces. The marginal portions are shown as being somewhat fanned out in FIGS. 2, 6 and 7 for purposes of illustration only. This structural result may be attained in various ways. In FIG. 4 there is shown a sheet 29 in the form of a frame interposed between the layers 12 and 14 and formed of a material which will not bond with or adhere to the material of said layers 12 and 14. Acetate has been found to form a very suitable material for this purpose having a higher melting point than that of the material of said layers 12 and 14. The center cut out portion of said sheet 29 is indicated by the reference numeral 30.

In actual practice the sandwich-like arrangement of the sheets 12 and 14 with the sheet 29 interposed therebetween are placed in a press as a unit and subjected to pressure and heat of a suitable degree to bond or fuse said central portion 19. Said central portion thus comprises the central portions of the in-faces 17 and 18 bonded together within the opening 30. With all three layers being placed in a press as a unit there results a uniform thickness throughout the full extent of the device.

In actual practice, an unpolished polyvinyl chloride material is used. The heat and pressure used in bonding the central portion of the device is applied to said outward facing surfaces 15 and 16 and thus provides a very smooth surface having natural self adhesive properties.

It will be understood that the separated marginal portions may extend only partially about or at opposite sides of the body portion as well as completely thereabout as shown.

The novel contruction of the device herein provides a unique structure which translates into shear forces those peel forces which arise from the load being borne by the device. The structure of the device which comprises the invention herein has a great capacity to withstand shear force and thus there results a device having relatively great load bearing capacity. It has been found that the device has a great deal more load bearing capacity than appears to be required for its normal and ordinary uses. At the same time, removal from the supporting surface is easily accomplished by peeling back an outer edge portion of the device.

So long as there are insignificant peel forces bearing on the outer edges of the device, there is little tendency for said edge portions to peel back or away from the supporting surface. The effect of the load is transferred through the central portion 19 of the device. With no outside air being admitted under said central portion, such as would be permitted by the peel back of an outer edge portion, the device maintains its holding power.

The device herein is shown in operating position in FIGS. 3 and 5. In being put to use, the object or article to be supported by the device herein such as the hanger 35 will have a smooth relatively non-porous back surface 36, such as a Formica.

All surfaces to be secured or stuck together should be clean and free from soil and free from traces of oil which might be secreted by a person's fingers. The surface 36 is then pressed onto an outer surface of said device, such as surface 16. The hanger 35 with the device 10 stuck thereto is then pressed onto a supporting surface, such as surface 38. No great amount of pressure need be exerted. However, sufficient pressure should be applied so that the marginal portions of the outer facing surfaces have good sealing engagement with the adjacent facing or mating supported and supporting surfaces. So long as said marginal outer facing surface portions maintain good sealing engagement, the device will exert its maximum load bearing capacity.

When a load 40 is placed or hung onto said hanger 35, the facing surfaces of the marginal portions tend to separate. Here the upper marginal portions tend to separate in response to a downward pull. The full extent of the marginal portions would tend to separate from one another in response to an outward pull. Hence the load is borne by the centrally fused or bonded portion of the device and there is no direct load borne by the marginal portions. With no direct pull being exerted on said marginal portions and particularly at the outer edges thereof, peel back is avoided and a maximum sealing effect is maintained.

Referring to FIG. 5, a rear view is shown as indicated of the outer surface 15 adhering to the supporting surface 38. The effect of the load 40 in bearing on the surface 15 is illustrated by the upward extension of the air space 42. The holding characteristic of the material used is not fully understood but it appears that it results from several factors. For example, when a smooth surface 15 of device 10 is pressed against the smooth supporting surface 38, a large part of the air is excluded from between the surfaces, whereupon atmospheric pressure exerts an unbalanced force on the outer surface of the layer 12 or 14. With this pressure, the coefficient of friction between the smooth surface 15 and the supporting surface 38 is sufficient to retain the device in a mounted position against the force of gravity. It is also probable that due to the smooth nature of the surface 15 of the device 10 and of the supporting surface 38, a certain degree of molecular adhesion is obtained in accordance with the well known principles of the Johannsen gauge blocks and the like. The self adhesive characteristics of such smooth surfaced plastic materials were retained even when they were placed in a bell jar and air exhausted therefrom; although the surface was smooth to the touch without a semblance of tackiness and even though the supporting surface was perfectly clean and dry, it remained mounted on the surface in the vacuum.

It has been found that the device herein when on the order of one inch square is of sufficient size to support a load up to six pounds for a relatively indefinite period of time. The device is readily removed by peeling back or freeing the outer faces of the marginal portions from adjacent surfaces to which they are adhering.

With reference to FIG. 6, the device 10' is shown of the same structure as the device 10 modified only to the extent that in lieu of the single sheet 29 separating the marginal portions 21 and 22, there is interposed a double layer of material comprising layers 50 and 51, framelike in form, which are non-adhesive relative to one another but which readily bond to the adjacent surfaces of said marginal portions when the device is placed under pressure and heat as above described. Thus there is a tendency here for said layers 50 and 51 to add body to said marginal portions 21 and 22 and this appears to improve the holding capacity of the device. Ordinary tissue paper has been found to be very suitable for this purpose.

FIG. 7 illustrates the device 10'' which is another modification similar to that shown in FIG. 6 wherein a suitable coating material 53 is applied to the facing surfaces of the marginal portions. Said coating material will be of such character as to bond to the facing surfaces of the marginal portions yet the facing surfaces of the coating material will be non-adhesive as to one another. Such a coating may be applied as by a silk screen process. Examples of suitable coating materials are octadecyl acrylate acrylic acid copolymer low adhesion coating as described in U.S. Letters Patent No. 2,607,711, polyvinyl carbamate low adhesion coating as described in U.S. Letters Patent No. 2,532,011, vinyl stearate maleic anhydride low adhesion coating as described in U.S. Letters Patent No. 2,876,894, calcium stearate, and cellulose acetate solution printed or coated to the facing.

In FIG. 8, the device here shown comprises in integral association as a unitary device a plurality of the individual devices 10 and is indicated generally by the reference numeral 55.

The construction here is identical with that described in connection with the device 10 with a marginal separated portion 56 thereabout and in spaced relation therein are bonded or fused areas here shown to be three in number indicated by the reference numerals 57, 58 and 59. Separated portions 61 and 62 etxend transversely between the respective bonded areas. It is obvious that the portions 61 and 62 would form marginal portions were the device 55 divided into three devices each having a single bonded area as in the case of the device 10.

In the structure here shown there is provided a device having a substantially greater load bearing capacity than is present with the use of a single device 10. Thus there is provided a device which may be formed having a plurality of bonded areas.

With reference to FIG. 9, a device 70 is shown which is substantially the same as the device 10 above described, having its like portions indicated by like characters. The device 70 comprises sheets 12 and 14 of inherent adhesive properties as hereinbefore described. Said device 70 differs from the device 10 in having one outward facing surface, such as surface 21, coated with a suitable adhesive 71 and having said adhesive coat protected by a removable liner 72. It will, of course, be appreciated that both outer surfaces 15 and 16 of device 70 may be coated with a suitable adhesive.

Thus the device 70 has a greater range of application than does the device 10. The surface or surfaces in having an adhesive applied thereto is not limited in use to being applied to a smooth relatively non-porous surface but may be applied and secured to porous or relatively non-smooth surfaces, or it may have secured to its objects having various surface conditions. In all other respects, the operation and use characteristics of the device 70 are the same as those above described in connection with said device 10.

Figure 10:
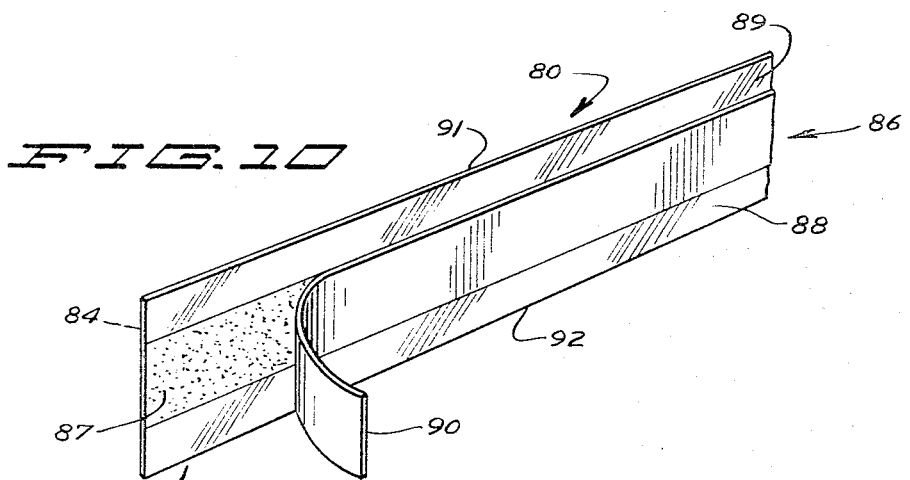
FIGS. 10 and 11 are broken views in perspective showing modifications of the invention herein.

Referring to FIG. 10, another embodiment of the invention herein is indicated generally by the character 80. This embodiment may take various specific forms but it is here shown in the form of an elongated strip member such as may be commercially prepared to be packaged as a roll. The side 84 of the body portion 82 (not here shown), is desgnated as the rear side and the whole extent thereof may be polished forming a naturally self adhesive surface as hereinbefore described or may have a suitable adhesive applied thereto.

The other or front side 86 of said body portion 82 comprises an adhesive area 87 formed by having an appriate adhesive material applied to a portion of the surface of said front side 86. Said adhesive area 87 will have a lesser width than the width of said body portion 82 centered transversely of said side 86 extending therealong as shown.

The marginal portions 88 and 89 of the surface 86 at either side of said adhesive area shall be unpolished and thus in a non-adhesive condition.

A removable protective strip or liner 90 is applied to overlie said area 87 to protect the adhesive material thereon until put to use.

It will be understood that useable lengths of said device 80 will be cut from a roll thereof.

The device 80 achieves substantial load bearing capacity in the same manner as the device 10 above described. A peeling or peel back action of the edge portions 91 and 92 is avoided by the novel construction of the device having the marginal portions 88 and 89 non-adhesive whereby there is no application of a load directly to said edge portions.

With regard to the body portion 82, the load supported or held by said adhesive area 87 will be applied to and held by the central longitudinal portion of said body portion. Thus the edge portions 91 and 92 will be free from any direct load and the marginal portions 88 and 89 will be free from any appreciable direct load since the normally occurring peel forces are translated into shear forces by the novel construction of the device, as previously described. The device exhibits great resistance to shear forces and this in turn is translated into substantial load bearing capacity.

Thus it is seen that the operation here, in substance, is like that present in the operation described above in connection with the device 10.

Figure 11:
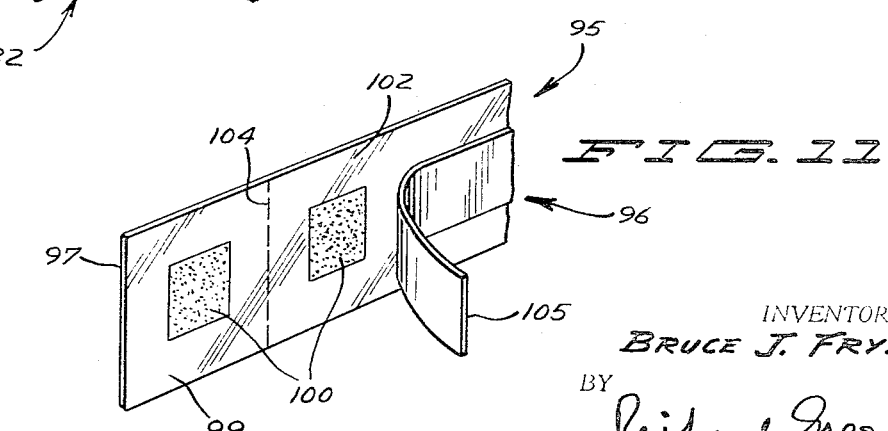

With reference to FIG. 11, a modified form 95 of said device 80 is shown comprising a body portion 96 having a rear side 97, not here shown, but which will be similar to side 84, above described, and having its other side 99 comprising adhesive coated areas 100, here shown as being rectangular in plan, which areas may be formed in the same manner as said adhesive surface 87.

Extending about said adhesive areas 100 and substantially coplanar therewith are non-adhesive marginal portions 102 formed in like manner as the marginal portions 88 and 89 above described. Overlying said adhesive areas 100 is a protective strip or liner 105.

A transverse line of perforation 104 is indicated as a means for having a predetermined length of said body portion 95 readily separable from a greater length of the same.

The device 95 is used in much the same manner as the device 80 with the advantage of having the article held or supported being located centrally of the entire periphery of the device and thus peel back is avoided about the entire edge portion of the device. In this respect, the device 95 represents a superior device and provides a relatively greater load bearing capacity.

As used herein, the term "naturally self adhesive surface" describes a very smooth surface having a natural clinging property whereby said surface will adhere to a variety of other smooth surfaces and does not depend upon the strong polar attraction of bonding that is characterized by adhesives such as pressure-sensitive, heat-activatible and solvent-activatible adhesives for its adhesive properties.

Thus it is seen that I have provided a device of small thickness very simply arranged and constructed to have substantial load bearing capacity in utilizing the naturally adhesive or holding characteristic of the material used, and in some instances I have supplemented said naturally self adhesive characteristic with an applied adhesive material without departing from the scope of my invention. My device has proved to be very successful in use.

It will, of course, be understood that various changes may be made in the form, details, arrangement and proportions of the parts, without departing from the scope of my invention which, generally stated, consists in a device capable of carrying out the objects above set forth, in the parts and combinations of parts disclosed and defined in the appended claims.

I claim:

1. A self securing article holding device comprising in combination:

a flexible body portion of relatively thin sheet material, said body portion having a perimeter and two outwardly disposed adhesive major faces, said body portion having coplanar non-adhesive areas adjacent a substantial portion of said perimeter, at least one major face of said body portion being naturally self adhesive, the other major face of said body portion having an adhesive material applied substantially centrally thereof and extending therealong, and said non-adhesive areas extending about the marginal portions along said other major face of said body portion having said adhesive material therebetween.

2. A self securing article holding device comprising in combination:

a flexible body portion of relatively thin sheet material, said body portion having a peripheral slit extending partially thereabout to form a marginal portion having separated portions, said separated portions having facing surfaces, means rendering said facing surfaces non-adherent, at least one outer major face of said body portion being naturally self adhesive.

3. A self securing article holding device according to claim 2, wherein:

an outer major face of said body portion has an adhesive material applied thereto.

4. A self securing article holding device according to claim 2, wherein:

said body portion comprises layers of sheet material.

5. A self securing article holding device according to claim 2, wherein:

said peripheral slit extends inwardly of said body portion parallel to the plane of the surfaces thereof.

6. A self securing article holding device according to claim 2, wherein:

said means comprises a non-adhesive layer of relatively thin sheet material.

7. A self securing article holding device according to claim 2, wherein:

said means comprises a surface treatment of at least one of said facing surfaces.

8. A self securing article holding device according to claim 2, having:

said non-adhesive marginal area extending about the perimeter of said body portion.

9. A self securing article holding device according to claim 3, wherein:

said adhesive material is a pressure-sensitive adhesive.

10. A self securing article holding device according to claim 1, having:

an adhesive material applied to one major face of said body portion the full width thereof, a pair of transversely spaced non-adhesive marginal portions on the other major face extending therealong, and an adhesive material applied to said other major face between said nonadhesive marginal portions.

11. A self securing article holding device according to claim 1, having:

an adhesive material applied to one major face of said body portion the full width thereof, said non-adhesive marginal area extending about the perimeter of the other major face of said body portion, and having an adhesive material applied to the central portion of said other major face.

12. A self securing artice holding device according to claim 10, wherein:

said adhesive material is a pressure-sensitive adhesive.

13. A self securing article holding device according to claim 11, wherein:

said adhesive material is a pressure-sensitive adhesive.

14. A self securing article holding device comprising in combination:

a flexible body portion comprising two layers of relatively thin sheet material in juxtaposition and joined together at a central region thereof,
said body portion having outwardly disposed adhesive major faces,
a separated marginal portion between adjacent of said layers extending about said body portion, said separated marginal portion having facing surfaces,
layers of relatively thin material, non-adhesive relative to one another, applied to each of said facing surfaces,
whereby the marginal portions of said adhesive major faces are freed of any appreciable direct load, the normally occurring peel forces being translated into shear forces by being transferred to said major faces through the united central region of said body portion.

References Cited by the Examiner

UNITED STATES PATENTS

| | | | |
|---|---|---|---|
| 2,030,135 | 2/1936 | Carpenter | 24—69 |
| 2,122,999 | 7/1938 | Burke | 248—29 |
| 2,142,194 | 1/1939 | Karifol | 206—56 |
| 2,170,147 | 8/1939 | Land | 206—56 |
| 2,492,411 | 12/1949 | Barnes et al. | 248—29 |
| 2,679,998 | 6/1954 | Keller | 248—205 |
| 2,765,998 | 10/1956 | Engert | 248—29 |
| 3,012,748 | 12/1961 | Breslow | 248—205 |
| 3,023,991 | 6/1952 | Fisher | 248—205 |
| 3,027,337 | 3/1962 | Tritsch | 260—5 |

FOREIGN PATENTS 371,568    10/1963    Switzerland.

CLAUDE A. LE ROY, *Primarmy Examiner.*